UNITED STATES PATENT OFFICE.

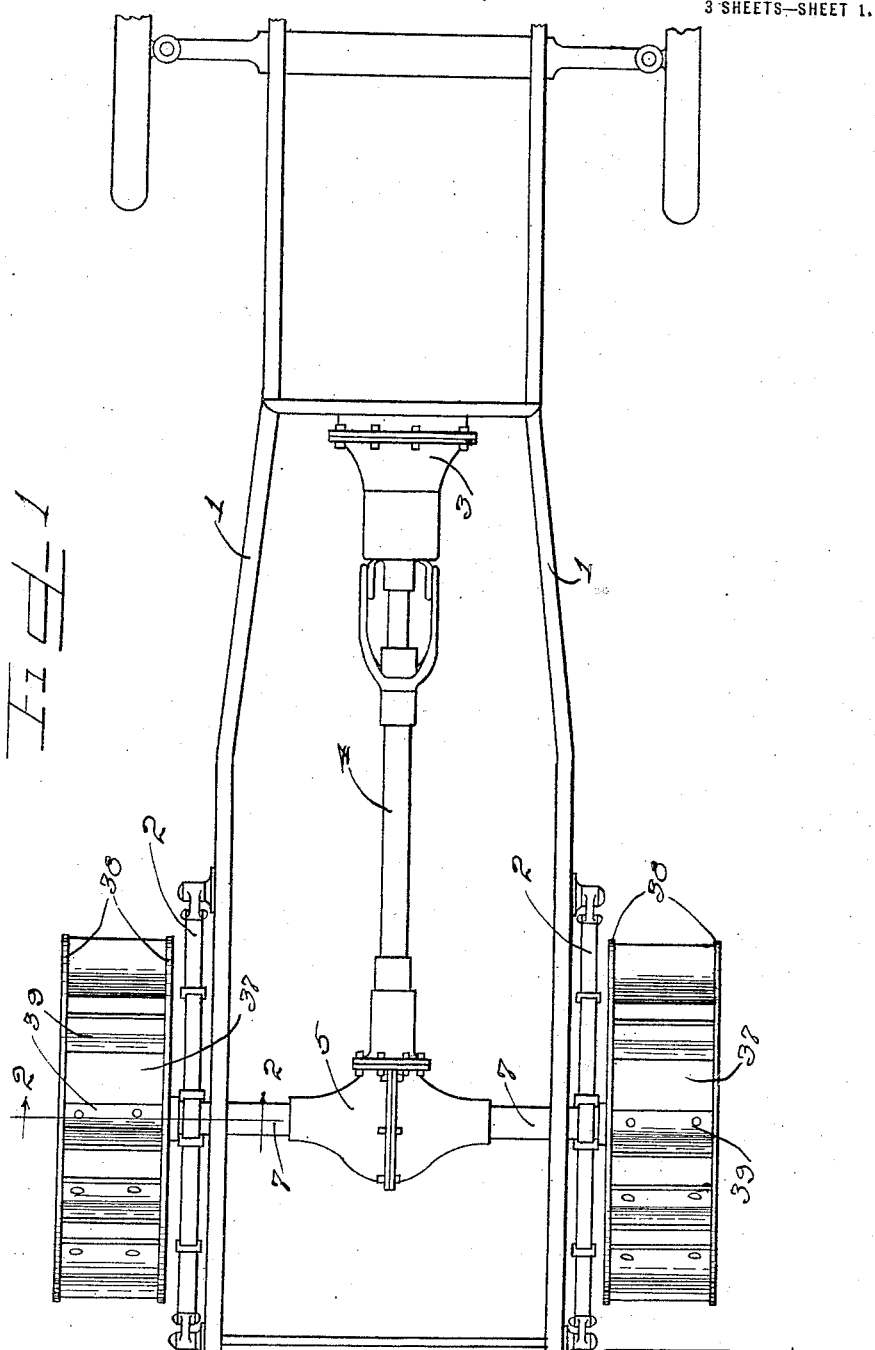

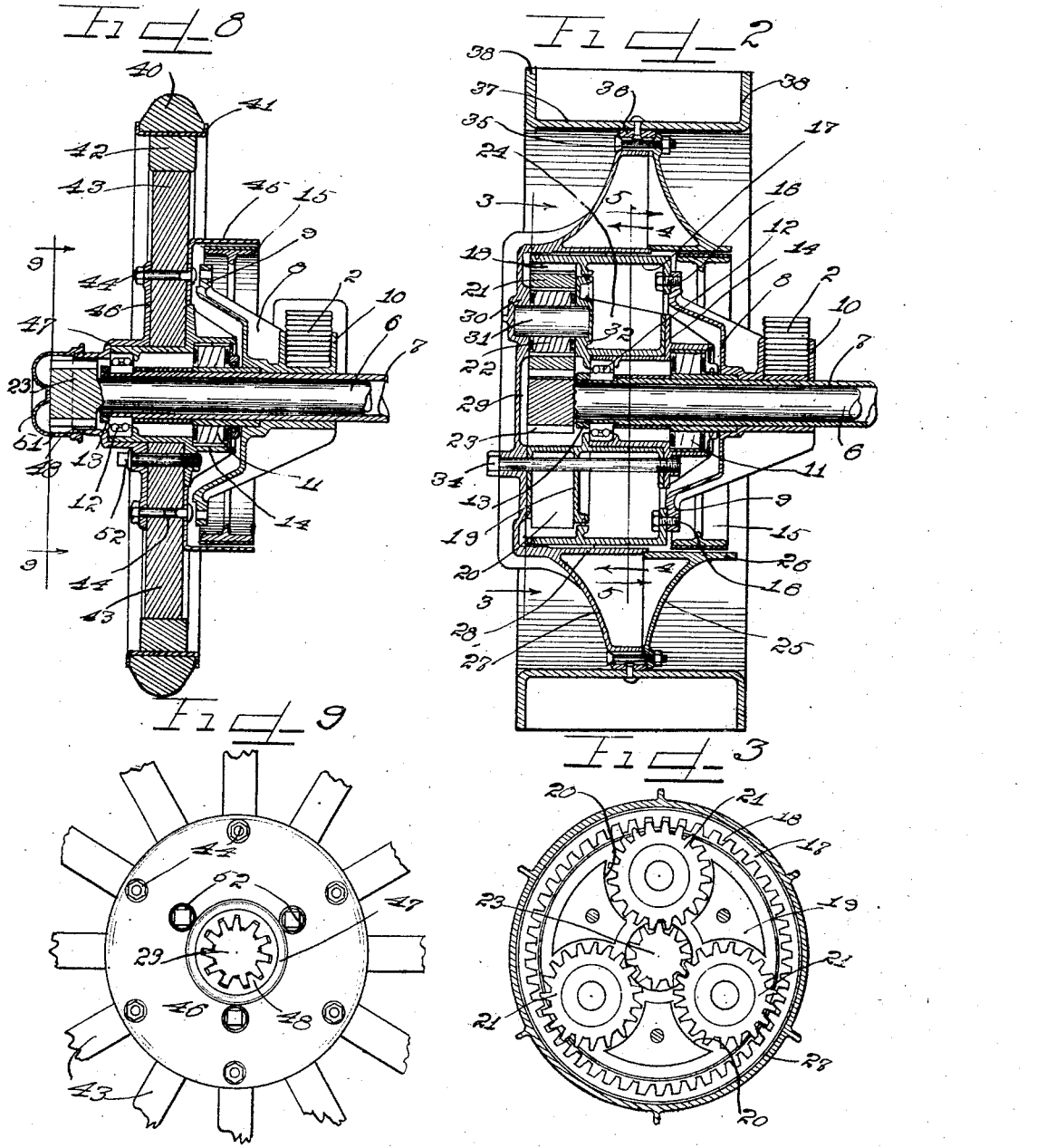

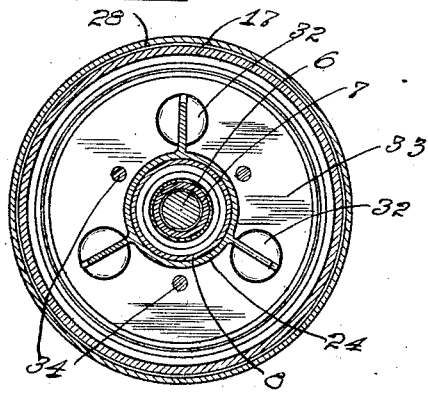
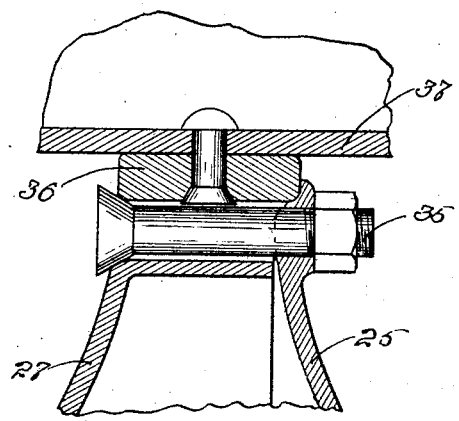
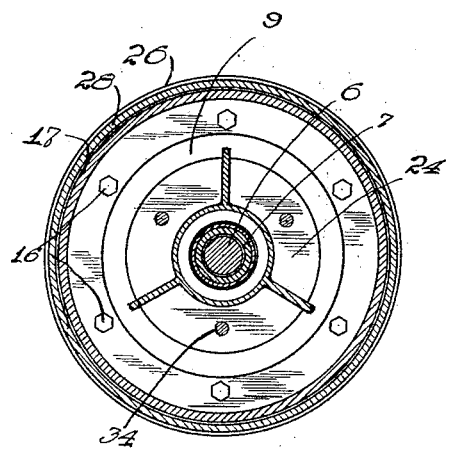
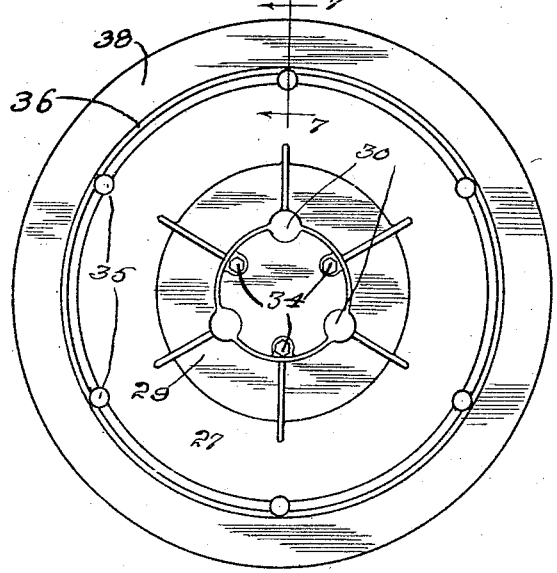

ALBERT E. COOK, OF EVANSTON, AND THOMAS VAN TUYL, OF KANKAKEE, ILLINOIS; SAID VAN TUYL ASSIGNOR TO SAID COOK.

DETACHABLE DRIVING WHEEL.

1,417,795.   Specification of Letters Patent.   Patented May 30, 1922.

Application filed June 14, 1918. Serial No. 240,095.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, respectively, have invented certain new and useful Improvements in a Detachable Driving Wheel; and we do hereby declare that the following is a full, clear, and exact description of the same, reference being had to the accompanying drawings, and to the numerals of reference which form a part of this specification.

This invention relates to an improved form of a truck wheel adapted to be readily and quickly removed from its mounting and replaced by a speed reducing tractor wheel which uses the truck wheel mounting and receives a drive therefrom to reduce the same.

It is an object of this invention to construct a wheel driving mechanism adapted to removably receive either a truck wheel or a speed reducing tractor wheel thereon and impart a drive thereto.

It is also an object of the invention to provide a detachable tractor wheel equipped with reducing gears adapted to co-act with an internally geared drum removably secured to stationary truck wheel parts of a vehicle whereby a reduced drive is imparted to the vehicle.

It is a further object of this invention to provide a driving mechanism adapted to removably receive and drive a truck wheel at the same rate of speed as that of the driving mechanism, or removably receive and drive a speed reducing tractor wheel adapted to change the speed of the drive imparted thereto.

It is furthermore an object of this invention to construct a driving mechanism adapted to permit convenient mounting of either a truck wheel or a speed reducing tractor wheel thereon and afford a mounting and a means for driving said wheels.

It is an important object of this invention to construct a truck wheel mechanism adapted to permit convenient replacement of parts thereof by a speed reducing tractor wheel mechanism adapted to interfit with the remaining parts of the truck wheel mechanism to receive and reduce a drive imparted thereby.

Other and further important objects of our invention will be apparent from the disclosures in the drawings and specification.

Our invention (in a preferred form) is illustrated in the drawings and hereinafter more fully described.

On the drawings:—

Figure 1 is a top plan view of an automobile chassis equipped with tractor wheels forming a part of this invention.

Figure 2 is an enlarged section taken on line 2—2 of Figure 1, with parts shown in elevation.

Figure 3 is a sectional view taken on line 3—3 of Figure 2.

Figure 4 is a section on line 4—4 of Figure 2.

Figure 5 is a section on line 5—5 of Figure 2.

Figure 6 is an outer end elevation of a tractor wheel.

Figure 7 is an enlarged fragmentary detail section on line 7—7 of Figure 6.

Figure 8 is a transverse section taken through a truck wheel, and disclosing parts common to both the truck and tractor wheels.

Figure 9 is a fragmentary elevational view taken on line 9—9 of Figure 8, with the cap omitted.

As shown on the drawings:—

The reference numeral 1, indicates the side sills of an automobile chassis, and 2, the rear springs. Mounted upon the forward portion of the chassis is a power plant 3, which is connected through a driving shaft 4, to the differential mechanism 5, to which the driving axles are connected. Driving axles 6, are disposed in axle sleeves 7. Rigidly secured upon each of the axle sleeves 7, is a hub member 8, provided with an apertured flange 9, and a spring box 10, to receive the respective spring 2. Mounted on the sleeve 7, to the outside of the hub member 8, is a roller bearing 11, and a ball bearing 12, held in position by means of a retaining nut or ring 13, threaded onto the exteriorly threaded end of the sleeve 7. Rotatably mounted upon the roller bearing 11, and the ball bearing 12, is a flanged collar or hub 14. The above mentioned parts numbered 6 to 14, inclusive, form part of the standard equipment of the automobile or truck as is also the brake mechanism designated by the reference numeral 15.

Rigidly but removably secured to the apertured flange 9, of the hub 8, by means of screw bolts 16, is a drum 17, having integrally formed on the outer margin of the inner peripheral surface thereof an internal gear 18. Disposed within the drum 17, is a spider 19, provided with a plurality of housings 20, in each of which is mounted a gear 21, which is mounted upon a roller bearing 22. Said gears 21, mesh at all times with the internal gear 18, and with a driving gear 23, secured upon the outer end of the driving axle 6. Integrally formed on the spider 19, is a rearwardly or inwardly directed webbed and flanged sleeve or collar 24, which engages around or over the collar 14, with the flange thereof abutting against the flange of the collar 14.

The tractor wheel proper comprises an inner casing member 25, having integrally formed thereon a drum 26, open at both ends to permit the inner member to fit around the brake mechanism 15, and the drum 17. The outer margin of the inner casing member is provided with a plurality of openings. Disposed to the outside or adjacent the inner casing member is an outer casing member 27, provided with an integral drum 28, open at its inner end to permit the same to engage around the drum 17, and interfit with the drum 26, of the inner casing member. The outer portion of the drum 28, is closed by means of an integral ribbed wall or plate 29, provided with bosses 30, to afford suitable bearings for supporting the outer ends of stub shafts 31, of the roller bearings 22, the inner ends of said stub shafts resting in suitable openings afforded by bosses 32, formed on the plate or wall 33, of the spider 19. The plate 29, is provided with a plurality of openings through which mounting or retaining bolts 34, project. Said bolts 34, as clearly shown on Figure 2, also project through suitable openings provided for the purpose in the spider 19, and the flange of the collar 24, and thread into threaded apertures in the flange of the collar 14, to hold the tractor wheel parts associated with the standard parts of the automobile. Locking bolts 35, project through the openings in the inner casing member 25, with the heads of said bolts 35, engaging the outer peripheral edge of a flat ring, hoop or felloe 36, which is rigidly riveted or bolted centrally on the inner peripheral surface of a rim 37, the margins of which are bent outwardly at right angles to form bearing or tracking flanges 38, which are reinforced by crosspieces or angle irons 39, secured to the outer surface of the wheel rim 37, between the tracking flanges 38.

In the replaceable truck wheel shown in Figures 8 and 9, the reference numeral 40, indicates a tire, supported in a rim 41, mounted on a felloe 42, to which the outer ends of a plurality of wheel spokes 43, are attached. The inner ends of the spokes 43, rest upon the collar 14, to the outside of the flange thereof. Rigidly secured upon the inside of the wheel to certain of the spokes 43, by means of bolts 44, is a drum 45, which fits around the brake mechanism 15. Also secured in position by means of the bolts 44, but to the outside of the spokes 43, is a plate 46, provided with an axial hub 47, having an internal gear 48, formed at the outer end of the inner surface thereof. The internal gear 48, is adapted to mesh with the driving gear 23, secured upon the outer end of the driving axle 6. A cap 51, is removably threaded upon the hub 47, to enclose the clutch drive formed by the driving gear 23, meshing with the internal gear 48. Projecting through suitable openings in the plate 46, are a plurality of locking or retaining screw bolts 52, which project through certain of the spokes 43, and have the inner ends thereof removably threaded into the flange of the collar 14.

The operation is as follows:—

It will be understood that one of the important features of this invention is to construct an automobile or truck equipped with wheel supporting and driving mechanisms for removably supporting and driving truck wheels at the same rate of speed as that of the driving axles of the automobile or truck, said truck wheels adapted to be conveniently removed from said supporting and driving mechanisms and replaced by speed reducing tractor wheels to permit the automobile or truck to be driven at a reduced rate of speed from that transmitted by the driving axles.

The truck wheel shown in Figures 8 and 9, forming a part of the automobile or truck is adapted to be conveniently mounted in position with the internal gear 48, thereof meshing with the driving gear 23, to form a clutch drive for said wheel. The assembled wheel as shown in Figure 8, is disposed with the hub 47, resting upon the collar 14, and with the drum 45, engaged around the brake mechanism 15. In the above position the internal gear 48, meshes with the driving gear 23, as described. The retaining bolts 52, are next engaged through the plate 46, and through certain of the spokes 43, and have the inner ends thereof removably threaded into the flange of the collar 14. Rotation of the axle 6, causes rotation of the driving gear 23, which being in mesh with the internal gear 48, causes rotation of the truck wheel and the collar 14, to which it is attached, at the same rate of speed as that of the axle 6.

When it is desired to replace a rear truck wheel of the automobile or truck by a tractor wheel as shown in Figure 2, the rear automobile or truck wheel is removed by removal of the bolts 52, leaving the parts numbered 6 to 14, inclusive, and part 23, in position to be used with the tractor wheel. The driving axle 6, and the gear 23, are in position to permit the drum 17, to be bolted or secured to the flange 9 by means of the screw bolts 16. The remainder of the tractor wheel may first be assembled and is then engaged over the drum 17, and the brake mechanism 15, with the gears 21, thereof, in mesh with the internal gear 18, and with the driving gear 23, secured upon the outer end of the driving axle 6. The retaining bolts 34, are next secured in position holding the assembled tractor wheel parts secured to the rotatable collar 14.

A rotation of the axle 6, by the engine 3, through the differential 5, also rotates the floating driving gear 23, which being held centrally in mesh with the three gears 21, acts to rotate said gears, which in turn travel around the stationary internal gear 18, of the drum 17, thereby causing rotation of the spider 19, the tractor wheel casing and rim, and the collar 14, which rests upon the roller bearing 11, and the ball bearing 12, at a rate of speed which is less than that transmitted by the floating gear 23.

Removal of the speed reducing tractor wheel as a unit is easily accomplished by removing the bolts 34, thereby permitting the removal of the tractor wheel from the drum 17, and hub 46. The screw bolts 16, are then removed to release the drum 17. The regular rear automobile or truck wheel may then again be mounted in position as shown in Figure 8.

From the construction described, it will be seen that a special reducing tractor wheel, driven by a power compensating floating gear mechanism, is provided wherein the parts of said wheel are all adapted to be readily replaced or removed for cleaning or repairs, and wherein the assembled parts may be readily mounted in position in a very short time without inconvenience after first removing a rear driving automobile or truck wheel from the supporting and driving mechanisms which are adapted to be used with both the truck and tractor wheels. With the replacement of the rear driving truck wheels by the improved form of tractor wheels, the automobile or truck may be driven at a reduced rate of speed through the speed reduction gear mechanisms.

We are aware that numerous changes may be made and various details of construction may be varied through a wide range without departing from the principles of this invention, and we therefore do not purpose limiting the patent granted otherwise than necessitated by the prior art.

We claim as our invention:—

1. The combination with an automobile or truck rear axle sleeve mechanism and a collar rotatably journaled thereon, of a stationary internal gear supported on said sleeve mechanism, and a speed reducing wheel adapted to be removably bolted to said collar to coact with said internal gear to convert the automobile or truck into a tractor.

2. The combination with an automobile rear axle sleeve mechanism, of an axle therein, a gear formed thereon, an internal gear rigidly supported on said sleeve, a collar rotatable on said sleeve mechanism, a wheel mechanism adapted to be removably secured to said collar, and gear means therein coacting with said internal gear and with said axle gear to receive a drive therefrom.

3. The combination with an automobile rear axle sleeve and a collar rotatably mounted thereon, of a floating geared driving axle in said sleeve, a stationary internal gear supported on said sleeve and a geared wheel mechanism adapted to be removably secured to said rotatable collar to coact with said internal gear and with said geared axle to receive and reduce a drive from said geared axle.

4. The combination with a rear axle sleeve, a hub member secured thereto and a collar rotatably mounted on said sleeve, of an axle in said sleeve, a floating driving gear formed thereon, a drum secured to said hub member, an internal gear formed therein, a wheel casing, balanced gears therein meshing with said driving gear and with said internal gear, and wheel members secured to said wheel casing adapted to be rotated by said driving gear through said internal gear and said balanced gears.

5. A wheel comprising a flanged rim, an inner and an outer drum casing secured thereto, a stationary drum engaged in said drum casing, an internal gear therein, a spider in said outer drum casing, gears therein meshing with said internal gear, a driving axle, and a driving gear thereon meshing with said gears to transmit a changed drive from said axle to said flanged rim.

6. The combination with the rear axle sleeve, hub and collar of an automobile, of a driving axle in said sleeve, a driving gear secured on the outer end of said driving axle, a stationary gear member on said hub, and a wheel mechanism engaged on said collar adapted to be connected with said stationary gear and with said driving gear to receive a drive from said axle.

7. A wheel comprising a rim, a drum secured thereto, a stationary drum projecting into said wheel drum, a gear forming a part of said stationary drum, a gear mechanism in said wheel drum meshing with the stationary drum gear, a driving axle, and a driving gear thereon meshing with said gear mechanism to transmit a changed drive from said axle to said rim.

8. The combination with a vehicle, of driving axles forming a part thereof, driving gears secured thereto, stationary drums, internal gears formed on said drums, rotatable means forming a part of said vehicle, and wheels adapted to be removably mounted on said rotatable means to engage said stationary internal gears and said driving gears to receive a drive from said driving gears to permit the vehicle to be driven at a reduced speed.

9. The combination with the driving means of a vehicle, of a driving axle connected therewith, a sleeve enclosing the axle, a collar journaled on said sleeve, a wheel, a hub forming a part thereof and engaged on said collar, means removably connecting said hub to said collar, and gear means between said wheel and axle to permit the wheel to receive a drive from said axle.

In testimony whereof we have hereunto subscribed our names in the presence of two subscribing witnesses.

ALBERT E. COOK.
THOMAS VAN TUYL.

Witnesses:
FRANK A. BREMER, Jr.,
FRED E. PAESLER.